United States Patent
De Landtsheere

(10) Patent No.: US 10,788,127 B2
(45) Date of Patent: Sep. 29, 2020

(54) PARKING LOCK ACTUATION SYSTEM AND AUTOMATIC GEARBOX FOR A VEHICLE

(71) Applicant: Transmisiones y Equipos Mecánicos, S.A. de C.V., Queretaro (MX)

(72) Inventor: Jannick De Landtsheere, Assebroek (BE)

(73) Assignee: TRANSMISIONES Y EQUIPOS MECANICOS, S.A. DE C.V. (MX)

( * ) Notice: Subject to any disclaimer, the term of this patent is extended or adjusted under 35 U.S.C. 154(b) by 161 days.

(21) Appl. No.: 16/040,321

(22) Filed: Jul. 19, 2018

(65) Prior Publication Data

US 2019/0024792 A1    Jan. 24, 2019

(30) Foreign Application Priority Data

Jul. 19, 2017   (EP) .................................... 17182129

(51) Int. Cl.
*F16H 63/34* (2006.01)
*F16D 48/02* (2006.01)

(52) U.S. Cl.
CPC ..... *F16H 63/3483* (2013.01); *F16H 63/3433* (2013.01); *F16D 2048/0278* (2013.01); *F16H 63/3441* (2013.01); *F16H 63/3475* (2013.01)

(58) Field of Classification Search
CPC ............... F16H 3/3483; F16H 63/3433; F16H 63/3425; F16H 2061/2861; F16H 25/20–2025/2096; F16H 63/34–3491; F16H 63/48–483; F16H 61/00–0009; F16H 61/0021–2061/0037; F16H 61/02–0297; F16D 2048/0257–0296

See application file for complete search history.

(56) References Cited

U.S. PATENT DOCUMENTS 7,797,933 B2 * 9/2010 Mankame ............. F15B 21/045
60/329
8,894,545 B2 * 11/2014 Berger .................... F16H 59/08
475/130

(Continued)

FOREIGN PATENT DOCUMENTS

DE          19851738        5/2000   ............ B60K 17/00
DE    102009035348 A1 *    2/2011   ......... F16H 63/3483

(Continued)

*Primary Examiner* — Ernesto A Suarez
*Assistant Examiner* — James J Taylor, II
(74) *Attorney, Agent, or Firm* — Hayes Soloway P.C.

(57) ABSTRACT

A parking lock actuation system for an automatic gearbox of a vehicle is described. The parking lock actuation system has a closed state in which a piston rod of a hydraulic cylinder is in a first position urging a locking pawl to block a gear of the automatic gearbox, and an open state in which the piston rod of the hydraulic cylinder is in a second position preventing the locking pawl from engaging the gear of the automatic gearbox. The parking lock actuation system further includes a first hydraulic valve being connected to a first hydraulic line, to a pressure source and a substantially non-pressurized reservoir, and a second hydraulic valve being connected to a first volume of the hydraulic cylinder, to the first hydraulic line and a non-pressurized reservoir. The first hydraulic valve includes an electrical actuator.

16 Claims, 2 Drawing Sheets

(56) References Cited

U.S. PATENT DOCUMENTS

| | | | | |
|---|---|---|---|---|
| 8,931,612 B2* | 1/2015 | Bauer | ................. | F16H 63/3483 |
| | | | | 192/219.5 |
| 8,997,478 B2* | 4/2015 | McWethy | ............... | E02F 3/964 |
| | | | | 60/429 |
| 9,435,428 B2* | 9/2016 | Neelakantan | ....... | F16H 61/0267 |
| 2011/0198190 A1* | 8/2011 | Steinhauser | ........ | F16H 63/3491 |
| | | | | 192/219.5 |
| 2011/0314945 A1 | 12/2011 | Brandenburg et al. | .... | 74/473.11 |
| 2012/0160631 A1 | 6/2012 | Bauer et al. | ................ | 192/219.5 |
| 2017/0002945 A1 | 1/2017 | Phelps | .................... | F16K 17/36 |
| 2019/0309847 A1* | 10/2019 | Merklein | .............. | F16H 63/483 |

FOREIGN PATENT DOCUMENTS

| | | | | |
|---|---|---|---|---|
| DE | 102010043257 | 5/2012 | ............ | F16H 63/38 |
| DE | 102010055859 | 6/2012 | ............ | F16H 63/38 |
| EP | 3064811 | 9/2016 | ............... | F16K 3/22 |
| FR | 2807718 | 10/2001 | ............. | B60K 41/22 |

\* cited by examiner

PARKING LOCK ACTUATION SYSTEM AND AUTOMATIC GEARBOX FOR A VEHICLE

The invention relates to a parking lock actuation system for an automatic gearbox of a vehicle. Furthermore, the invention is directed to an automatic gearbox for a vehicle comprising a parking lock actuation system.

BACKGROUND OF THE INVENTION

Parking lock actuation systems for an automatic gearbox of a vehicle are known, which have a closed state in which a piston rod of a hydraulic cylinder is in a first position urging a locking pawl to block a gear of the automatic gearbox, and an open state in which the piston rod of the hydraulic cylinder is in a second position preventing the locking pawl from engaging the gear of the automatic gearbox.

The majority of automatic transmissions or automatic gearboxes for vehicles comprise a device for keeping the vehicle stationary when parked. These devices are referred to as parking locks.

They can be manually actuated, which means that they are actuated by a vehicle driver via a gear shift lever also called PRND-lever.

Alternatively, they can be actuated automatically, thus they are operated without manual interaction.

A typical requirement for such parking locks is "default to park". This means that in the absence of power, e. g. electricity and/or hydraulic pressure, the parking lock has to be in a locked or closed state in which the vehicle is kept stationary.

Once in the closed state, an unintended loss of parking lock engagement also has to be avoided. In other words, the parking lock has to stay in the locked or closed state, thereby keeping the vehicle stationary.

A further requirement is to avoid unintended parking lock engagement, especially while the vehicle is moving.

In known parking lock actuation systems, an industry standard plunger, pawl and gear system is used. To engage the parking lock, i. e. hold the vehicle stationary, a plunger spring needs to be preloaded so that the plunger will force the pawl into the gear teeth. To disengage the parking lock, i. e. to allow vehicle movement, a hydraulic piston can retract the plunger.

A parking lock actuation system of the type mentioned above is disclosed in DE 10 2010 055 859 A1.

The objective of the invention is to further improve such parking lock actuation systems and corresponding automatic gearboxes for vehicles. Thereby, a parking lock actuation system shall be created, which is uncomplicated in design, manufacturing and assembly without making any compromise on the safety aspects. Furthermore, such a parking lock actuation system shall be cost-effective and compact.

BRIEF DESCRIPTION OF THE INVENTION

This object is achieved by a parking lock actuation system of the type mentioned above, which further comprises a first hydraulic valve being connected to a first hydraulic line, to a pressure source and a substantially non-pressurized reservoir, and a second hydraulic valve being connected to a first volume of the hydraulic cylinder, to the first hydraulic line and a non-pressurized reservoir, wherein the first hydraulic valve comprises an electrical actuator. Thus, both valves are able to block a hydraulic connection between the hydraulic cylinder and the hydraulic pressure source. The piston rod is biased in a normally closed state, i. e. in its first position. Consequently, both valves need to be in a predetermined position in order to open the parking lock. In the event of a double failure, when both valves would attempt unintended parking lock opening, a mitigation action can consist of lowering the system pressure supplied to the valves down to a value which results in not actuating the piston rod. As a consequence, the parking lock actuation system offers excellent safety against unintended loss of parking lock engagement. Furthermore, such a parking lock actuation system is uncomplicated in design and therefore cost-effective in manufacturing and assembly. Additionally, it is compact and reliable.

Preferably, the piston rod is movable from the first position to the second position by pressurizing the first volume. A second volume of the hydraulic cylinder may be connected to a non-pressurized reservoir. This means that only the first volume of the hydraulic cylinder needs to be pressurized in order to move the parking lock actuation system from its closed state to its open state. When moving the piston rod to the second position, the plunger is retracted so that it does not urge the locking pawl into engagement with the gear anymore. Consequently, the locking pawl is free to disengage from the gear. Plunger, plunger spring, locking pawl and gear mechanism are preferably state of the art elements. Thus, the parking lock actuation system is particularly uncomplicated in design and production.

In an advantageous variant, the piston rod is biased into the first position by a rod biasing spring. The parking lock actuation system thus can be referred to as "normally closed". The rod biasing spring is preferably stronger than the plunger spring mentioned above. This means that also in a situation in which the locking pawl and/or the plunger are not able to move because the gear is in a position geometrically not allowing the locking pawl to move in between two teeth, the piston rod can be moved. The locking pawl will then engage the gear once it has moved into a position, allowing the pawl to engage the gear. Such a parking lock actuation system reliably engages the parking lock in order to keep a vehicle stationary.

In an embodiment, the second hydraulic valve comprises a biasing means, preferably a spring, biasing the second hydraulic valve into a position hydraulically connecting the first hydraulic line and the first volume. Thus, in the absence of electricity, the second hydraulic valve takes this position. As a consequence, the position of the second hydraulic valve always is well defined.

The second hydraulic valve can be a 3-way, 2-position valve comprising an electric actuator, in particular a solenoid. The second hydraulic valve can be directly actuated or pilot actuated. It may comprise at least one position sensor or position switch being able to detect a valve position. Such valves are well known in the art and thus easy to produce or source on the market. Furthermore, such valves are compact and reliable.

Preferably, the second hydraulic valve is of the open-center type. Consequently, in case the second hydraulic valve is stuck in a center position, the parking lock can still be operated, e. g. moved to its closed position. One way to do this is to actuate the hydraulic cylinder via the first hydraulic vale. Another way is to reduce the hydraulic system pressure. Still another way is to turn off the vehicle's engine. This also leads to a reduced hydraulic system pressure. Once the hydraulic system pressure has fallen below a certain threshold, the piston of the hydraulic cylinder can be moved into the closed position by a biasing means, e. g. a spring. In summary, the parking lock offers a very high reliability and safety.

According to a preferred embodiment, the first hydraulic valve is adapted to remain in its position in the absence of electricity. Thus, an interruption of electricity supply does not result in any movement of the first hydraulic valve. Consequently, it always is in a defined position. Thereby, in the presence of hydraulic supply pressure also the piston rod is kept in a defined, stationary position. Hence, unintended parking lock engagement or loss thereof is avoided.

The electrical actuator of the first hydraulic valve can be a linear actuator. Consequently, the first hydraulic valve can be actuated in a precise and energy efficient manner.

In a variant, the linear actuator comprises an electric motor, in particular an electric stepper motor, and an actuation rod being connected to the electric motor by a thread. The thread preferably is of the self-locking type. Consequently, the linear actuator cannot be moved via a movement of the valve spool or the actuation rod. Such actuators are known to be able to convert a relatively small torque into a relatively high force and being compact at the same time. The connection of the actuation rod to the valve spool can be direct or indirect, rigid or non-rigid. In the event of electric failure, the valve spool is kept in its position.

The first hydraulic valve can be a 3-way, 2-position valve.

Preferably, the parking lock actuation system comprises an electro-mechanical holding actuator, in particular a solenoid, being adapted to hold the piston rod in the second position when energized. The actuator is preferably designed as a so called "normally open" actuator, thus, when not energized, the holding actuator does not hold the piston rod. The actuator is only able to hold the piston rod, not to move it. In alternative solutions, the holding actuator can also act on the piston or any other part mechanically linked to the piston rod, e.g. the plunger or the pawl. The holding actuator can also be an electric motor. This is an easy way to keep the piston rod in a defined position. Furthermore, unintended parking lock engagement is avoided in the absence of hydraulic pressure.

In an alternative, the parking lock actuation system comprises at least one position sensor being adapted to directly or indirectly detect a position of the piston. The position sensor can act on the piston or any part connected to it, e. g. a magnet. It is used to monitor a state of the parking lock actuation system. The position sensor can be replaced by one or more position switches.

Advantageously, the parking lock actuation system comprises a parking lock control unit being adapted to actuate the first hydraulic valve, the second hydraulic valve and/or the electro-mechanical holding actuator as a function of vehicle driver input and/or vehicle condition parameters. Such a driver input can be a position of a shift lever, e. g. parking position, and/or the pressing of a P-button. Vehicle condition parameters include engine on/off and/or vehicle speed.

In a variant, the first hydraulic valve and/or the second hydraulic valve comprises a position sensor. Thereby, the corresponding valve positions can be detected. Preferably, the position sensors are connected to the parking lock control unit. The position sensors can also be position switches, which are switched from one state to another, when the corresponding valve has reached or left a predefined position.

Furthermore, the problem is solved by an automatic gearbox for a vehicle comprising a parking lock actuation system according to the invention. Such a gearbox offers the required safety functionalities in a reliable manner and is compact and cost-efficient in manufacturing and assembly.

The invention further provides a method for switching a parking lock of an automatic gearbox of a vehicle from a closed state to an open state, wherein in a closed state a piston rod of a hydraulic cylinder is in a first position urging a locking pawl to block a gear of the automatic gearbox and a second hydraulic valve is in a position hydraulically connecting a substantially non-pressurized reservoir and a first volume of the hydraulic cylinder, and wherein in an open state, the piston rod of the hydraulic cylinder is in a second position preventing the locking pawl from engaging the gear of the automatic gearbox. The method comprises the following steps:

a) Deactivating the second hydraulic valve in order to connect the first volume and a first hydraulic line, b) Moving a first hydraulic valve to a position in which it connects the first hydraulic line and a pressure source, preferably followed by actuating a holding actuator holding the piston rod in the second position.

Still further, the invention provides a method of switching a parking lock of an automatic gearbox of a vehicle from an open state to a closed state, wherein in a closed state a piston rod of a hydraulic cylinder is in a first position urging a locking pawl to block a gear of the automatic gearbox, and wherein in an open state, the piston rod of the hydraulic cylinder is in a second position preventing the locking pawl from engaging the gear of the automatic gearbox, comprising the step of moving a first hydraulic valve into a position, connecting a first hydraulic line to a substantially non-pressurized reservoir and/or moving a second hydraulic valve to a position, connecting a first volume of the hydraulic cylinder to the reservoir, and preferably deactivating a holding actuator which then disengages a piston rod.

Both methods offer a highly reliable and easy way of operating a parking lock actuation system of the type described above.

The hydraulic parking lock actuation system can be equipped with a purely mechanical override system. This enables the opening of the parking lock in the absence of hydraulic pressure and/or electrical control signals. A preferred way of doing this is to have an override system interface on the piston rod or on associated components. It is especially advantageous to ensure that the override action can be detected by the position sensing setup. Such an override system can either require manual action to close it or to hold the parking lock open.

BRIEF DESCRIPTION OF THE DRAWINGS

The invention will now be explained with reference to an embodiment which is shown in the attached drawings. In the drawings.

DETAILED DESCRIPTION OF THE INVENTION

Figure 1:
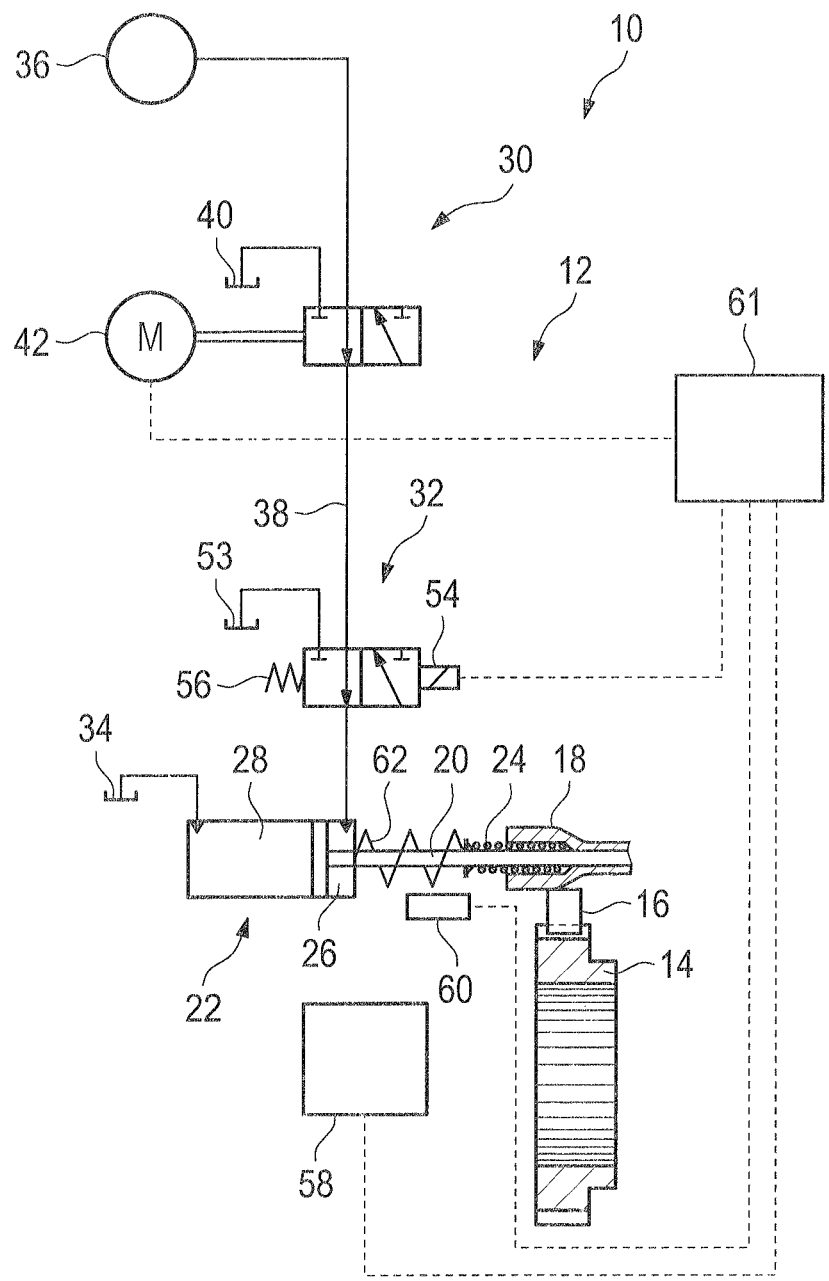
FIG. 1 shows an automatic gearbox according to the invention and a parking lock actuation system according to the invention in a schematic representation.

FIG. 1 shows an automatic gearbox 10 for a vehicle comprising a parking lock actuation system 12. The gears of the gearbox 10 are represented schematically by a single gear 14.

The parking lock actuation system 12 comprises a locking pawl 16 which is able to engage the gear 14. It is actuated by a plunger 18 being connected to a piston rod 20 of a hydraulic cylinder 22.

The piston rod 20 and the plunger 18 are biased with respect to each into a closed position of the parking lock, i.e. a parked position. To do so, a plunger spring 24 is interposed between the piston rod 20 and the plunger 18.

Such plunger-and-pawl systems are standard practice in parking locks for automatic gearboxes.

In order to actuate the hydraulic cylinder 22 which provides a first volume 26 and a second volume 28, the parking lock actuation system 12 comprises a first hydraulic valve 30 and a second hydraulic valve 32.

Both hydraulic valves 30, 32 are directly or indirectly connected to the first volume 26 whereas the second volume 28 is connected to a substantially non-pressurized reservoir 34.

The first hydraulic valve 30 is a 3-way, 2-position valve, which connects a pressure source 36, a first hydraulic line 38 and a substantially non-pressurized reservoir 40.

The valve 30 further comprises an electrical actuator 42 which is a linear actuator in the present embodiment.

Figure 2:
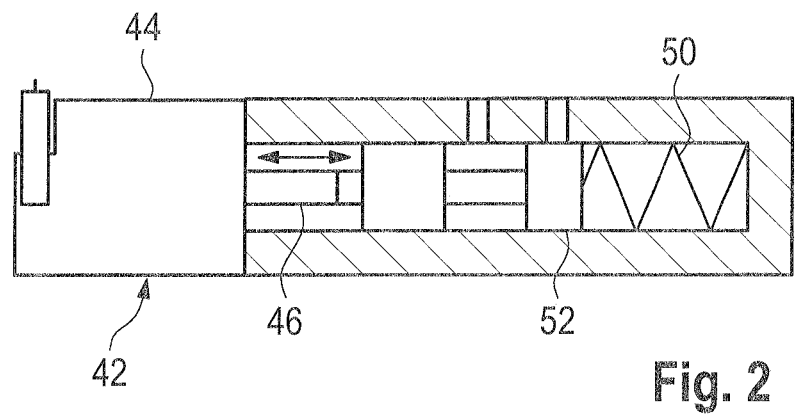
FIG. 2 shows a detail of an electric actuator of a first hydraulic valve of a parking lock actuation system according to the invention.
Figure 3:
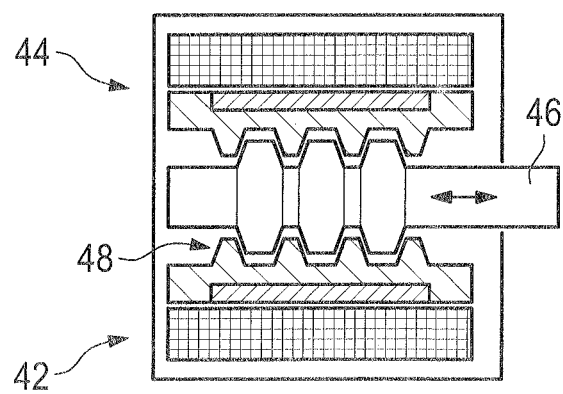
FIG. 3 shows a further detail of the electric actuator of FIG. 2.

As can be seen from FIGS. 2 and 3, the linear actuator comprises an electric motor 44 which preferably is an electric stepper motor, and an actuation rod 46 which is connected to the electric motor 44 by a thread 48.

The first hydraulic valve 30 also comprises a biasing spring 50 which acts on a spool 52 of the first hydraulic valve 30.

The first hydraulic valve 30 is adapted to remain in its position in the absence of electricity. This feature is realized by the fact that the thread 48 is of the self-locking type. This means that an axial force exerted on the thread 48 will not cause it to turn. This is especially the case for a force exerted by the biasing spring 50 and/or a hydraulic force resulting from one of the components of the first hydraulic valve 30.

The second hydraulic valve 32 connects the first hydraulic line 38, the first volume 26 and a substantially non-pressurized reservoir 53.

The reservoirs 34, 40, 53 are shown as separate reservoirs but can also be realized as one single reservoir.

The second hydraulic valve 32 also is a 3-way, 2-position valve which comprises an electric actuator 54. In the embodiment shown the electric actuator 54 is a solenoid.

Furthermore, the second hydraulic valve 32 comprises a biasing means 56 biasing the valve 32 into a position in which it hydraulically connects the first hydraulic line 38 to the first volume 26 of the hydraulic cylinder 22.

Figure 4:
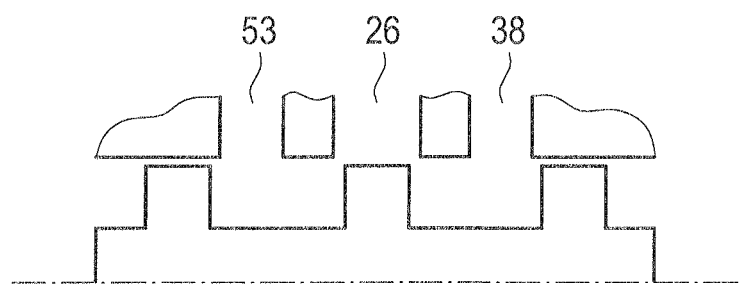
FIG. 4 shows a detail of a second hydraulic valve of a parking lock actuation system according to the invention.

In addition, the second hydraulic valve 32 is of an open-center type, which means that in an intermediate state of the valve 32, the supply, i. e. the first hydraulic line 38, and the tank, i. e. the reservoir 53, are both connected to the output side of the valve, i.e. the first volume 26 of the hydraulic cylinder 22 (cf. FIG. 4).

The parking lock actuation system 12 further comprises an electro-mechanical holding actuator 58 which is adapted to hold the piston rod 20 in a position in which its does not engage the gear 14.

Additionally, the parking lock actuation system 12 comprises a position sensor 60 which is adapted to directly or indirectly detect a position of the piston rod 20.

Moreover, the parking lock actuation system 12 comprises a parking lock control unit 61 which is adapted to actuate the first hydraulic valve 30, the second hydraulic valve 32 and/or the electro-mechanical holding actuator 58. The control unit 61 operates as a function of a vehicle driver input and/or vehicle condition parameters.

The automatic gearbox 10 and the parking lock actuation system 12 can be operated as follows.

With respect to all operating states, the parking lock actuation system 12 is said to be in a closed state when the piston rod 20 of the hydraulic cylinder 22 is in a first position in which it urges the locking pawl 16 to block the gear 14 of the automatic gearbox 10.

The parking lock actuation system 12 is said to be in an open state when the piston rod 20 is in a second position. In this position the plunger 18 is retracted so that it does not urge the locking pawl 16 to engage the gear 14. Consequently, the locking pawl 16 is free to disengage from the gear 14.

The movement of disengaging can be assisted by a biasing means, e.g. a spring (not shown), acting on the locking pawl 16 or by a rotatory movement of the gear 14, which results in pushing the locking pawl 16 out of engagement with the gear's teeth.

Such a rotatory movement of the gear 14 can for example result from the fact that the vehicle is parked on a hill and the engagement of the locking pawl 16 and the gear 14 is loaded.

Thereby, the piston rod 20 is movable from the first position to the second position by pressurizing the first volume 26.

The piston rod 20 is biased into the first position by a rod biasing spring 62, thus the corresponding spring force has to be overcome when moving the rod into the second position.

In an exemplary case, the vehicle may be in a parked state. In such a first operational state, the parking lock actuation system 12 is in the closed state and an engine of a vehicle in which the parking lock actuation system is installed is off. In this state, no hydraulic pressure is provided by the pressure source 36. At the same time, the first hydraulic valve 30 is in a position hydraulically connecting the first hydraulic line 38 to the reservoir 40. The second hydraulic valve 32 hydraulically connects the first hydraulic line 38 to the first volume 26 of the hydraulic cylinder 22. The holding actuator 58 is off. Thus, it does not hold the piston rod 20. This operational state typically is chosen when the vehicle is parked.

When a driver enters the vehicle and starts the engine, the parking lock actuation system 12 switches to a second operational state in which the parking lock actuation system 12 is still in the closed state. In contrast to the first operational state, the vehicle's engine is running. Consequently, hydraulic pressure is provided by the pressure source 36. The first hydraulic valve 30 is kept in a position hydraulically connecting the first hydraulic line 38 to the reservoir 40. As a result, hydraulic pressure from the pressure source 36 is not transmitted to the first hydraulic line 38. In contrast to the first operational state, the second hydraulic valve 32 is now in a position hydraulically connecting the first hydraulic volume 26 to the reservoir 53. Consequently, the hydraulic cylinder 22 is separated from the pressure source 36 in a redundant manner. The holding actuator 58 still is off, thus not engaging the piston rod 20.

Preferably, the second hydraulic valve 32 is switched to the position hydraulically connecting the first hydraulic volume 26 and the reservoir 53 just before starting the engine. Thereby, unintended opening of the parking lock is prevented in a very secure manner.

When the driver deactivates the parking lock, the parking lock actuation system 12 is switched to a third operational state in which the engine is running and the pressure source 36 provides hydraulic pressure. The parking lock actuation system 12 is in the open state. In this state, the first hydraulic valve 30 is in a position hydraulically connecting the pressure source 36 to the first hydraulic line 38, and the second hydraulic valve 32 is in a position hydraulically connecting the first hydraulic line 38 to the first volume 26. Consequently, the first volume 26 is pressurized, and the piston rod 20 is in its second position preventing the engagement of the locking pawl 16 and the gear 14. The holding actuator 58 now may hold the piston rod 20 in its position, thus is switched on. This operational state is usually used when the car is moving.

In order to park the vehicle, the driver may stop the vehicle in a parking spot with the engine still running. Thus, the parking lock actuation system is still in the third operational state. Now, the parking lock is to be engaged. Therefore, at first the holding actuator 58 is deactivated, thus not holding the piston rod 20 anymore. Then, the first hydraulic valve 30 is moved to a position hydraulically connecting the first hydraulic line 38 to the reservoir 40. Also, the second hydraulic valve 32 can be moved to a position hydraulically connecting the first hydraulic volume 26 to the reservoir 53. In doing so, the first volume 26 is de-pressurized and the piston rod 20 moves to the first position. The movement of the piston rod 20 can be assisted by the spring 62. The system thus is again in the second operational state. Theoretically, it is sufficient to switch either the first hydraulic valve 30 or the second hydraulic valve 32 or the holding actuator 58, but it is preferred to actuate all of them in order to achieve a defined safe state when restarting the vehicle.

In the following, the engine can be switched off, putting the system into the first operational state.

Alternatively, the engine can be switched off while keeping the parking lock actuation system 12 in the open state. In such a fourth operational state, no pressure is supplied by the pressure source 36. The first hydraulic valve 30 is in a position hydraulically connecting the first hydraulic line 38 to the reservoir 40. The second hydraulic valve 32 is in a position hydraulically connecting the first hydraulic line 38 to the first volume 26. The position thus corresponds to the first operational state. The holding actuator 58 is in a position holding the piston rod 20. This operational state typically is used when the vehicle is to be towed, e.g. in a car wash.

The invention claimed is:

1. A parking lock actuation system for an automatic gearbox of a vehicle, having a closed state in which a piston rod of a hydraulic cylinder is in a first position urging a locking pawl to block a gear of the automatic gearbox, and an open state in which the piston rod of the hydraulic cylinder is in a second position preventing the locking pawl from engaging the gear of the automatic gearbox, the parking lock actuation system further comprising:
   a first hydraulic valve being connected to a first hydraulic line, to a pressure source and a substantially non-pressurized reservoir, and
   a second hydraulic valve being connected to a first volume of the hydraulic cylinder, to the first hydraulic line and a non-pressurized reservoir,
   wherein the first hydraulic valve comprises a linear actuator in the form of an electric motor, and an actuation rod connected to the electric motor by a thread.

2. The parking lock actuation system of claim 1 wherein the piston rod is movable from the first position to the second position by pressurizing the first volume.

3. The parking lock actuation system of claim 1 wherein the piston rod is biased into the first position by a rod biasing spring.

4. The parking lock actuation system of claim 1 wherein the second hydraulic valve comprises a biasing device, biasing the second hydraulic valve into a position hydraulically connecting the first hydraulic line and the first volume.

5. The parking lock actuation system of claim 4, wherein the biasing device comprises a spring.

6. The parking lock actuation system of claim 1 wherein the second hydraulic valve is a 3-way, 2-position valve comprising an electric actuator, in particular a solenoid.

7. The parking lock actuation system of claim 1 wherein the second hydraulic valve is of an open-center type.

8. The parking lock actuation system of claim 1 wherein the first hydraulic valve is adapted to remain in its position in the absence of electricity.

9. The parking lock actuation system of claim 1 wherein the first hydraulic valve is a 3-way, 2-position valve.

10. The parking lock actuation system of claim 1, further comprising an electro mechanical holding actuator adapted to hold the piston rod or a plunger or the locking pawl or in the second position when energized.

11. The parking lock actuation system of claim 10, wherein the electro mechanical holding actuator comprises a solenoid.

12. The parking lock actuation system of claim 1, further comprising at least one position sensor being adapted to directly or indirectly detect a position of the piston rod.

13. The parking lock actuation system of claim 1, further comprising a parking lock control unit being adapted to actuate the first hydraulic valve, the second hydraulic valve and/or an electro mechanical holding actuator as a function of vehicle driver input and/or vehicle condition parameters.

14. The parking lock actuation system of claim 1 wherein the first hydraulic valve and/or the second hydraulic valve comprises a position sensor.

15. The parking lock actuation system of claim 1, wherein the electric motor is an electric stepper motor.

16. An automatic gearbox for a vehicle comprising the parking lock actuation system of claim 1.

* * * * *